United States Patent
Taylor et al.

(10) Patent No.: US 8,214,543 B2
(45) Date of Patent: *Jul. 3, 2012

(54) SYSTEMS AND METHODS FOR CONTROLLING HDA SYSTEM CAPABILITIES

(75) Inventors: Wilson E. Taylor, Austin, TX (US); Douglas D. Gephardt, Dripping Springs, TX (US); Larry E. Hand, Meridian, MS (US); Richard V. Spina, Austin, NJ (US)

(73) Assignee: D2Audio Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/218,305

(22) Filed: Aug. 25, 2011

(65) Prior Publication Data

US 2011/0305354 A1 Dec. 15, 2011

Related U.S. Application Data

(63) Continuation of application No. 12/202,361, filed on Sep. 1, 2008, now Pat. No. 8,028,101.

(60) Provisional application No. 60/969,614, filed on Sep. 1, 2007, provisional application No. 60/969,615, filed on Sep. 1, 2007.

(51) Int. Cl.
*G06F 3/00* (2006.01)
(52) U.S. Cl. .......................... 710/8; 381/120
(58) Field of Classification Search .................. None
See application file for complete search history.

(56) References Cited

U.S. PATENT DOCUMENTS

| | | | |
|---|---|---|---|
| 5,797,102 A | 8/1998 | Hallikainen et al. | |
| 6,012,142 A | 1/2000 | Dokic | |
| 6,016,075 A | 1/2000 | Hamo | |
| 6,205,223 B1 | 3/2001 | Rao | |
| 6,279,045 B1 | 8/2001 | Muthujumaraswathy et al. | |
| 6,301,366 B1 * | 10/2001 | Malcolm et al. | 381/119 |

(Continued)

FOREIGN PATENT DOCUMENTS

EP 1 677 574 A 7/2006

(Continued)

OTHER PUBLICATIONS

"4-Channel DAC and 6-Channel ADC High Definition Audio Codec, ALC262 Series Datasheet (Rev. 1.7)," Realtek Semiconductor Corp., Mar. 22, 2007, pp. i-64, http://www.realtek.cz/download/datsheets/alc262_v1.7.pdf.

(Continued)

*Primary Examiner* — Elias Mamo
(74) *Attorney, Agent, or Firm* — Fliesler Meyer LLP (57) ABSTRACT

Systems and methods for controlling the capabilities of an High Definition Audio (HDA) system, wherein the system determines whether an optional component such as a plug-in card is connected to the system and then configures itself in a baseline configuration if the optional component is not connected or configures itself in a different, alternative configuration if the optional component is connected. In one embodiment, a codec of the system includes a programmable processor configured to read configuration authorization information and also read configuration information from the optional component if it is connected to the system. The processor also controls the configuration of the HDA system and the operation of the codec based on the authorization and configuration information. The system can thereby provide different features and functionality using the same hardware.

29 Claims, 3 Drawing Sheets

U.S. PATENT DOCUMENTS

| | | | |
|---|---|---|---|
| 6,427,181 | B1 | 7/2002 | Furuhashi |
| 6,748,515 | B1 | 6/2004 | Hendrickson |
| 6,920,553 | B1 | 7/2005 | Poisner |
| 7,425,992 | B2 | 9/2008 | Feeler et al. |
| 7,640,041 | B2 * | 12/2009 | Ragan .......................... 455/572 |
| 2002/0119803 | A1 | 8/2002 | Bitterlich |
| 2005/0160195 | A1 * | 7/2005 | Bruner et al. .................... 710/8 |
| 2006/0247811 | A1 | 11/2006 | Zaucha |
| 2007/0005160 | A1 | 1/2007 | Zaucha |
| 2007/0067506 | A1 | 3/2007 | Cho |
| 2007/0239438 | A1 | 10/2007 | Chuang |
| 2009/0060228 | A1 * | 3/2009 | Chieng et al. ................ 381/120 |

FOREIGN PATENT DOCUMENTS

| | | |
|---|---|---|
| JP | 2007-020230 | 1/2007 |
| WO | WO 9519096 | 7/1995 |

OTHER PUBLICATIONS

"Low Power, Stereo CODEC w/Headphone & Speaker Amps," Cirrus Logic, Dec. 1, 2006, pp. 1-82, http://www.digchip.com/datasheets/download_datasheet.php?id=1104824&part-number=CS42L52.

"Overview of Audio Codec '97, revision 1.0," Intel Corporation, http://euc.jp/periphs/AC97_OVR.PDF, pp. 1-4.

International Search Report and Written Opinion dated Jan. 30, 2009 for Application No. PCT/US2008/074964, 13 pages.

International Search Report dated Nov. 25, 2008 for Application No. PCT/US2008/074963.

International Search Report and Written Opinion dated Jan. 30, 2009 for Application No. PCT/US2008/074966, 14 pages.

International Search Report dated Nov. 27, 2008 for Application No. PCT/US2008/074965.

Kennedy, R., et al., "Tailor configurable processors for audio codecs," Electronic Engineering Times-Asia, Aug. 16, 2006, pp. 1-3.

Maxim Integrated Products, "Innovative Audio Cost-Reduction and Space-Saving Solutions Tune Out the Competition," 2006, pp. 1-23, XP002503538; http://newsletter.spezial.de/pdfdata/AUDIO_9.pdf> [retrieved on Nov. 11, 2008].

Princeton Technology Corp., "Stereo 2W Class-D Amplifier With Built-In Audio Processor," Jul. 2008, pp. 1-4, XP002503539; http://www.princeton.com/tw/> [retrieved on Nov. 11, 2008].

Office Action dated Jan. 25, 2011, in European Patent Application No. 08828228.0-1245.

International Search Report and Written Opinion dated Jan. 30, 2009 for Application No. PCT/US2008/074967, 15 pages.

"High Definition Audio Specification, Revision 1.0," Intel Corporation, Apr. 15, 2004, http://download.intel.com/standards/hdaudio/pdf/HDAudio 03.pdf, pp. i-173.

English Translation of Office Action dated Nov. 22, 2011, in Japanese Patent Application No. 2010-523193.

* cited by examiner

SYSTEMS AND METHODS FOR CONTROLLING HDA SYSTEM CAPABILITIES

CROSS-REFERENCE TO RELATED APPLICATIONS

This application is a continuation of U.S. patent application Ser. No. 12/202,361, filed Sep. 1, 2008, which claims the benefit of U.S. Provisional Patent Application 60/969,614, filed Sep. 1, 2007, and U.S. Provisional Patent Application 60/969,615, filed Sep. 1, 2007. Priority is claimed to each of these applications, and each of these applications is incorporated herein by reference.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

Detailed Description Of Exemplary Embodiments

One or more embodiments of the invention are described below. It should be noted that these and any other embodiments described below are exemplary and are intended to be illustrative of the invention rather than limiting.

As described herein, various embodiments of the invention comprise systems and methods for controlling the capabilities of a High Definition Audio system, wherein the system determines whether an optional component such as a plug-in card is connected to the system and then configures itself in a baseline configuration if the optional component is not connected or configures itself in a different, alternative configuration if the optional component is connected. By configuring the system to limit, if necessary, the features and functions that are provided, the manufacturer can reduce the number of different system designs that have to be provided and can thereby reduce costs.

One embodiment is implemented in the HDA system of a PC. The HDA system includes a codec that operates using a programmable processor such as a DSP. When the system is powered up, the DSP determines whether an optional component (e.g., a plug-in application card) is connected to the system. If the plug-in card is not connected, the DSP configures the HDA system to provide a baseline set of features and functions. This baseline configuration may be constrained by authorization information that is stored in a memory which is accessible by the codec. If the plug-in card is connected, the DSP reads information from the plug-in card, such as a component identifier and configuration information that defines the "personality" of the card. Based on the configuration information and the previously noted authorization information, the DSP determines a configuration that is available (based on the hardware of the HDA system and the plug-in card) and authorized, and then configures the system accordingly. This configuration may provide all the available features and functions, or it may limit some of them (e.g., certain audio processing may not be available, a 100 W amplifier on the plug-in card may only be allowed to operate at 20 W, etc.). The DSP itself may also modify its operation in accordance with the defined configuration.

Before describing exemplary embodiments of the invention, it will be helpful to review some relevant background information. With the proliferation of PCs and advances in computer technologies, an increasing number of advanced features are available to consumers. Consumers may purchase a wide range of computer systems that range from basic systems with very few features to very expensive systems that are configured to provide high quality audio/visual experiences. The wide range of features that are available in current PCs and the ability to customize a PC with selected features results in an extremely large number of possible configurations.

While the large number of options that are available in a PC may be good for consumers who have a wide range of needs, it can cause problems for manufacturers. More specifically, because consumers may desire a wide range of options even within a particular area, such as audio capabilities, a manufacturer of the corresponding system components may be required to provide many different configurations in order to meet the needs of its customers. For instance, some customers may only need (and wish to pay for) a basic version of a feature, while other customers may desire the highest quality components and are willing to pay for the higher quality. Having to generate different component designs and manufacture the different components adds to the complexity of the manufacturer's tasks and adds to the cost incurred by both the manufacturer and the customers.

The present systems and methods address this problem by providing a wide range of capabilities within a single component and then configuring the component for different customers so that different capabilities are provided. Thus, a customer who desires a system with a basic level of functionality can pay a first price for a particular component which has only the basic features enabled. Other features that are actually within the capabilities of the component are disabled. A customer who desires a system with more advanced features and functionality can pay a higher price for the same component and which has the advanced or extended features enabled in addition to (or in place of) the basic features. "Extended" is used here to indicate that the new features are different, though not necessarily more advanced than the basic features. The different levels of functionality may be referred to as different "modes" or "personalities" of the component or system.

One area in which the present systems and methods can be implemented is PC-based audio. Consumers of PCs have different audio needs, ranging from no audio at all, to basic low-quality PC speakers or headphone outputs, to high fidelity audio that is demanded by gamers or audiophiles who purchase high-end multimedia systems in order to achieve the ultimate audio/visual experience from their PCs. The technology is available to meet the needs of these different customers. Low-quality audio is obviously easy to provide, and high-quality PC-based audio has been gradually gaining popularity, beginning with the introduction of Intel's High Definition Audio Specification Rev 1.0 in 2004, which is incorporated herein by reference.

While the High Definition Audio (HDA) specification allows quite a bit of flexibility in the design of a high-quality audio system for a PC, much of this flexibility is lost when the design is implemented. For instance, while an HDA system may have multiple codecs that perform different types of processing on audio data, these codecs are hardwired and their functionality cannot be changed. As a result, it is still necessary to produce different designs and manufacture different components in order to meet the wide range of needs of different consumers.

The present systems and methods provide the capability to more easily meet the different needs of different consumers by providing an HDA codec that incorporates a programmable processor such as a DSP. Because the DSP is programmable, the functionality of the codec can be modified by changing the programming of the DSP. The use of a DSP also allows the codec to adapt to changes in other components and to provide different system configurations, so that different sets of system requirements can be met with minimal increases to the complexity and cost of producing the system components.

The present systems and methods establish the "mode" or "personality" of a processor-based system such as an audio amplification system based on identification of an authorized and available configuration. This configuration may be determined based on default configuration parameters, component and personality identifiers associated with removable components, and/or authorization and verification keys that are accessible to the processor.

These systems and methods improve system scalability by dynamically adjusting the operational and functional characteristics of a processor-based system. Functional and performance characteristics that can be controlled include but are not limited to: output power level, output channel configuration, amplifier performance, software processing functionality and processor feature enable/disable. A basic operational functionality is initially available. The enablement of extended features and functions can be authorized and defined by a removable component (such as a plug-in application card) in concert with "protection keys" that are accessible to the processor. The ultimate personality of the system relies on the established protection keys which constrain the functional and performance characteristics of the entire system.

Figure 1:
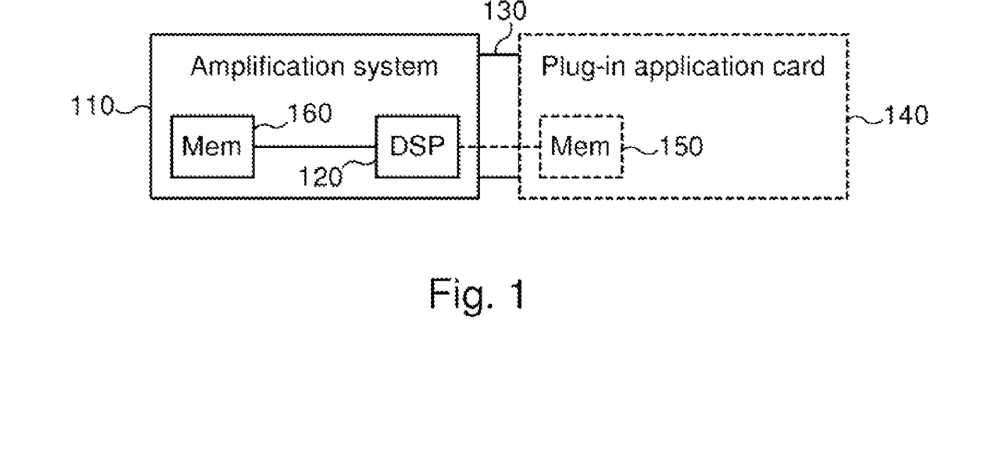
FIG. 1 is a functional block diagram illustrating an audio amplification system in accordance with one embodiment.

Referring to FIG. 1, a functional block diagram illustrating an audio amplification system in accordance with one embodiment is shown. Audio amplification system 110 is implemented in a PC. The system utilizes an HDA architecture that is constructed on the motherboard of the PC. Audio amplification system 110 includes a programmable processor 120 that is separate from the CPU of the PC. Processor 120 may, for example, be a DSP. Processor 120 executes tasks associated with the processing of audio data.

Audio amplification system 110 includes a connector 130 that is configured to accept a removable component such as a plug-in application card 140. Plug-in application card 140 is shown using dotted lines to indicate that it is removable and may either be connected to or disconnected from audio amplification system 110. Plug-in application card 140 may contain a variety of components, such as an amplifier output stage, I/O connectors, power supply connectors, sensors, memory, etc. As depicted in FIG. 1, plug-in application card 140 includes a non-volatile memory 150.

Processor 120 of audio amplification system 110 is configured to determine the presence of plug-in application card 140 when the system is powered up. If plug-in application card 140 is not connected to the system, processor 120 will configure the system for operation without the card. This baseline configuration may be determined based upon configuration information that is stored in a local memory 160. This configuration information may, for example, include protection keys that identify which features of the audio amplification system are authorized to be used. If plug-in application card 140 is connected to the audio amplification system when the system is powered up, processor 120 will detect the presence of the card and will obtain configuration information associated with the card from memory 150. Based upon this information and the information obtained from local memory 160, processor 120 will configure the system and begin operation.

Figure 2:
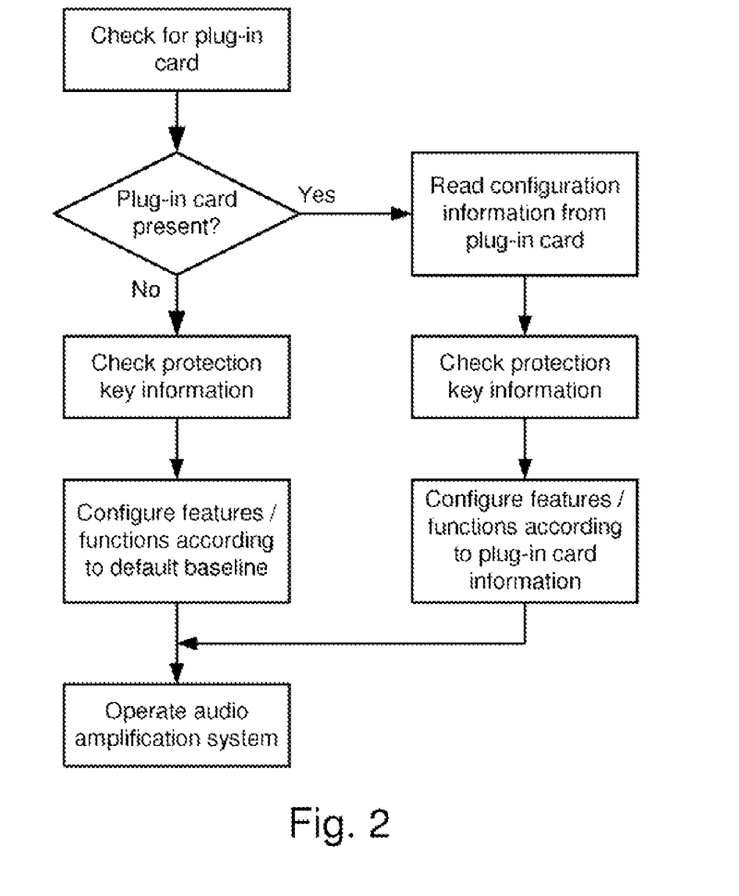
FIG. 2 is a flow diagram illustrating the process of configuring the audio amplification system in accordance with one embodiment.

This process is illustrated in FIG. 2. FIG. 2 is a flow diagram illustrating the process of configuring the audio amplification system in one embodiment. As shown in the figure, the processor first checks for the presence of the plug-in application card. It should be noted that in alternative embodiments, the processor may check for the presence of other types of removable or optional components. If the plug-in application card is not present, the processor retrieves protection keys and/or other configuration information from an accessible memory. This memory may be local to the HDA codec in which the processor resides, or it may be another memory, such as the PC's system memory which can be accessible through the HDA bus. After this configuration information is obtained, the processor configures the system, enabling a baseline set of features and functions, while disabling other features and functions that are not authorized for use in the system. The system then begins operation.

If, when the processor checks for the plug-in application card, the card is present, the processor accesses the memory on the plug-in card to obtain configuration information associated with the card. The processor then retrieves the protection keys and/or other configuration information from the local memory. Based upon the information from the local and plug-in-card-based memories, the processor determines the authorized configuration of the audio amplification system and proceeds to configure the system. After the system is properly configured, it begins operation.

As noted above, one embodiment may be implemented in the HDA audio system of a PC. The primary goal of the HDA specification is to describe an infrastructure within a PC environment which is designed to support high quality audio. This infrastructure provides a mechanism for transferring audio data directly from the PC's memory system to one or more audio codecs via an HDA bus. The codecs typically convert the digital audio data received from the memory to analog signals and process these signals to output signals that can be provided as, for instance, a line output, a modem output, or an output to an amplifier. The use of a programmable processor in the HDA codec enables the codec to not only process audio data, but also perform the functions of configuring the HDA audio system.

Figure 3:
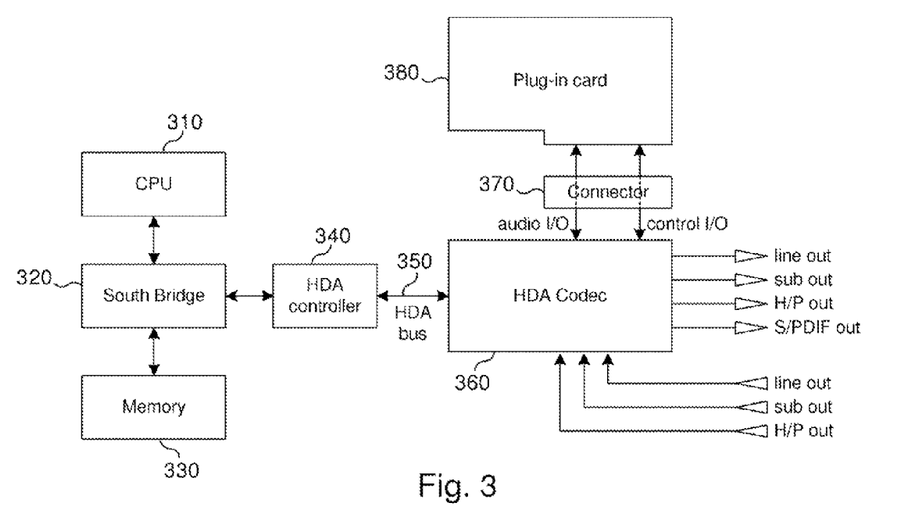
FIG. 3 is a functional block of an exemplary PC-based embodiment of the present audio amplification system.

Referring to FIG. 3, a functional block of an exemplary PC-based embodiment of the invention is shown. In this embodiment, PC 300 includes a CPU 310 that is coupled to the system's south bridge 320. CPU 310 performs most of the processing of the PC, but it not involved in the audio processing and related control functions of the HDA subsystem.

The primary components of the HDA subsystem include HDA controller 340, HDA bus 350 and HDA codec 360. Plug-in application card 380 (and connector 370) also function as part of the HDA subsystem, but as noted above, the plug-in card may or may not be present in the system. System memory 330, which is coupled to both south bridge 320 and HDA controller 340, also serves as part of the HDA system to the extent that it stores audio data that is transferred by HDA controller 340 to codec 360.

Codec 360 has various input and output lines. The inputs in this embodiment include a line input, a microphone input and a S/PDIF (Sony Philips Digital Interconnect Format) input. The outputs include a line output, a sub output, an H/P output and a S/PDIF output. These inputs and outputs are typically provided as back panel connections on the PC motherboard.

When plug-in application card 380 is connected to codec 360 (through connector 370), additional inputs and outputs are provided. The inputs to this exemplary plug-in card include two or four preamplifier inputs. The outputs include two to eight preamplifier outputs and 2 to 8 power amplifier outputs. These inputs and outputs have corresponding back panel connections on the plug-in card itself.

Figure 4:
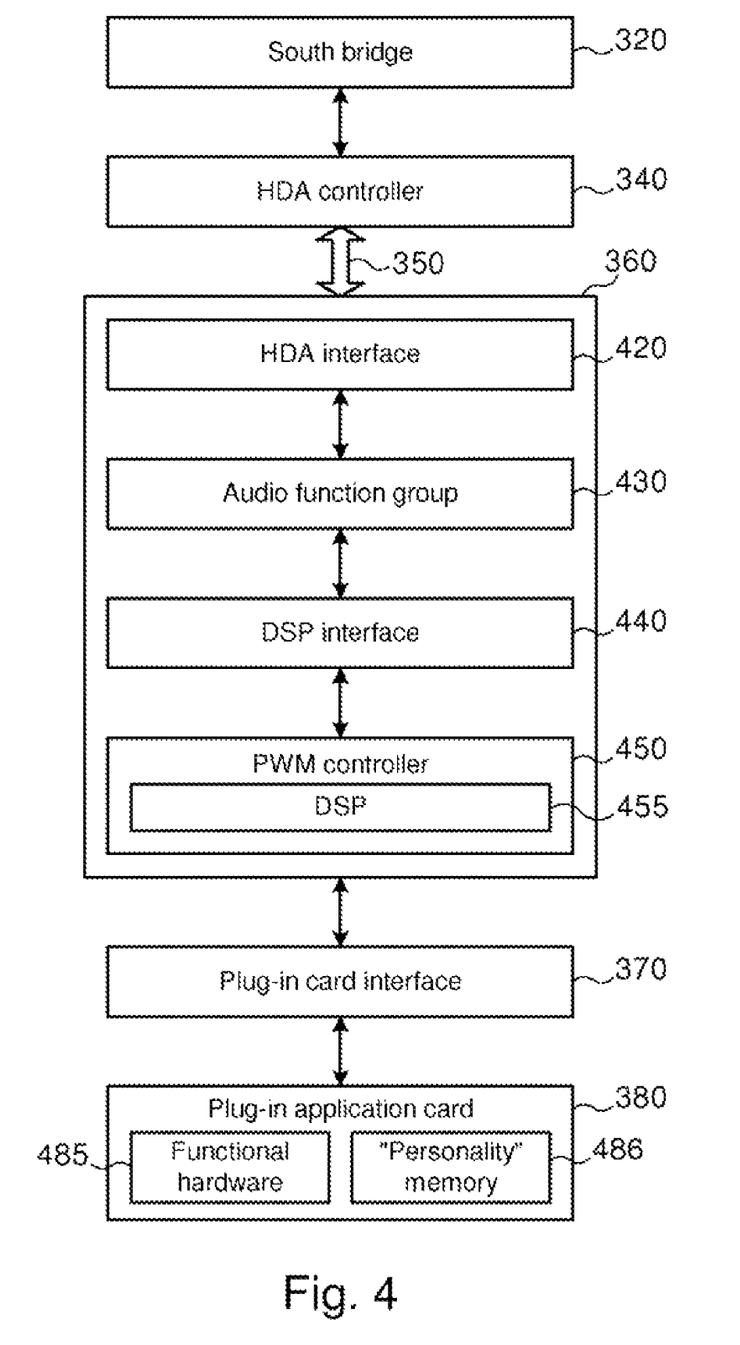
FIG. 4 is a functional block diagram illustrating in more detail the HDA subsystem of one embodiment.

Referring to FIG. 4, a functional block diagram illustrating the HDA subsystem in more detail is shown. Similar to FIG. 3, FIG. 4 depicts HDA controller 340 coupled to the south bridge 320 of the PC. HDA codec 360 is coupled to HDA controller 340 by HDA bus 350. Codec 360 is coupled to plug-in application card 380 via plug-in card interface 410.

Codec 360 includes an HDA interface 420, an audio function group 430, a DSP interface 440, and a Class-D PWM controller 450 that is based on DSP 455. HDA controller 340 transmits information over the HDA bus in frames of time-multiplexed data. HDA interface 420 reads the data off the HDA bus and forwards the data to the appropriate nodes in audio function group 430. Audio function group 430 includes various components (referred to in the HDA specification as "widgets"), each of which is addressable as a node in the audio function group. The identifiers (Node IDs) for some nodes may be mapped to DSP 455, which is configured to perform many of the functions that are performed by particular widgets in conventional HDA codecs. The DSP therefore receives data that would normally be directed to these widgets (for example, volume control data would normally be directed to a mixer widget in a conventional codec, but volume is controlled by the DSP in this embodiment, so this data is forwarded to the DSP.) DSP interface 440 serves in this embodiment to reformat the one-byte wide data from the HDA bus into three-byte wide data that is used by the DSP.

PWM controller 450 can provide PWM output signals via the output lines of the codec (if plug-in application card 380 is not installed), or it can provide these signals to the hardware 485 on plug-in card 380 via interface 410 (if the plug-in card is installed). Codec 360 also accesses memory 486 on plug-in card 380 via interface 410 to determine the configuration or "personality" of the card so that the codec can be configured in accordance with this information.

Figure 5:
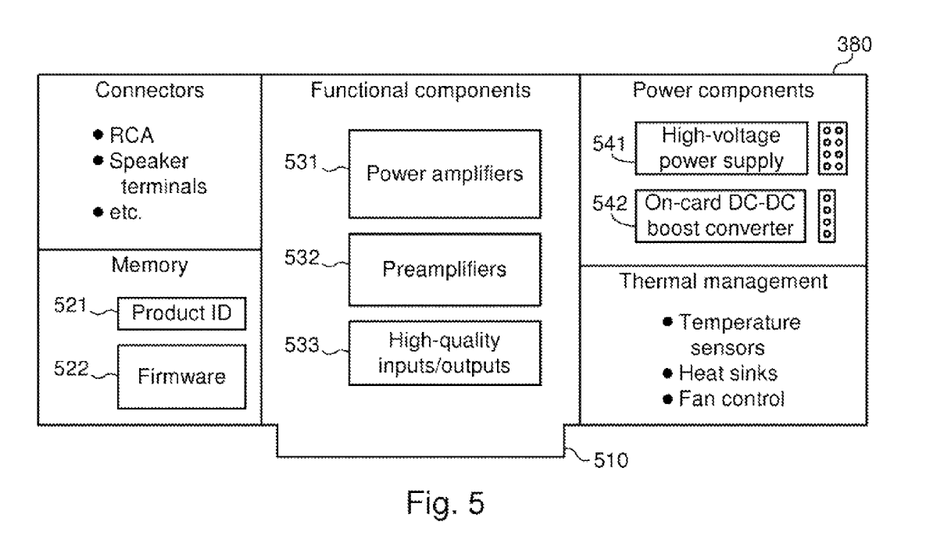
FIG. 5 is a diagram illustrating the configuration of a plug-in application card in accordance with one embodiment.

Referring to FIG. 5, a block diagram illustrating an exemplary plug-in application card is shown. As depicted in the figure, plug-in card 380 includes a connector portion 510 that is designed to mate with a connector on the motherboard to establish a connection with the processor-based HDA codec. Connector portion 510 includes sufficient means to connect the various components of the plug-in card to the codec. The component groups shown in the figure include connectors, memory, functional (amplifier and I/O) hardware, power components and thermal management components.

The connectors may include any type of back panel terminals that are suitable for the audio amplification system, such as RCA jacks, speaker terminals, optical signal connectors and the like, as may be appropriate for the various input and output signals. The memory components in this example include a product ID memory 521 (in this case an EEPROM) and a memory for storing the firmware relating to the card's personality 522. Product ID memory 521 is small and may store a product identifier, license ID, or other identifying information that is associated with the card. Firmware memory 522 is larger, and may be used to store configuration information such as the capabilities of the components on the card, programming associated with the configuration, etc. the firmware memory may also identify constraints or limitations that are imposed on the system so that some of the capabilities of the card and/or codec cannot be accessed (even though they are available).

The functional hardware of plug-in card 380 may include such things as power amplifiers 531, preamplifiers 532 and high-quality analog inputs and/or outputs 533. Typically, these components will serve as the power stage of the audio amplification channels embodied in the HDA subsystem of the PC. The capabilities of the functional hardware may, as noted above, be limited by the programming of the firmware memory. For instance, amplifier components 531-532 may be capable of producing 100 W of output power, but the programming in the firmware memory may constrain the system to operate at 20 W.

The power components on plug-in card 380 may include such items as a high-voltage power supply 541 and a power converter 542 configured to supply power to the functional hardware on the card, and appropriate connectors to enable the power converter to receive power from a source external to the PC. The card may also receive power from the PC for some of its basic functions that are less energy-intensive, such as reading memories 521-522. Finally, plug-in card 380 includes components for thermal management of the system such as temperature sensors, heat sinks, fan controls, etc.

Because codec 360 incorporates a Class-D PWM controller that is based on a DSP, the operation of the codec can be customized to include a variety of features, functions and capabilities. For example, the codec can perform parametric equalization, psycho-acoustic effects, room equalization, virtual surround sound, bass boost, mixing, custom filters, and so on. In the present systems, the codec is capable, with appropriate programming and authorization, of providing all of these features. Not every system, however, will have the appropriate programming and authorization for every feature.

The system therefore determines which of the features are authorized (e.g., by checking the protection keys noted above), determines which of the features are supported by the hardware (e.g., by checking the memory on the plug-in application card, if installed) and then configures the system to provide the features that are available and authorized. The codec may also download programming or data if necessary to provide some of these features. In addition to enabling and disabling particular codec features, the DSP may modify the operation of the codec based on the personality information stored on the plug-in card. This may be necessary or desirable in order to achieve higher quality audio, to obtain more economical performance, or for various other reasons.

Those of skill in the art will appreciate that the various illustrative logical blocks, modules, circuits, and algorithm steps described in connection with the embodiments disclosed herein may be implemented as electronic hardware, computer software (including firmware,) or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

It should be noted that the terms "PC" and "personal computer" are used herein to refer to a wide range of computing systems that are commonly purchased and used by individual consumers. These systems may include desktop computers, laptop computers, tablet computers, game systems and the like, and may be used in home, office, mobile or other environments. It should also be noted that, although the embodiments described above focus on codecs that incorporate DSP's, other embodiments may use types of processors other than DSP's (such as general purpose processors, programmable microcontrollers, etc.) to achieve the programmability, configurability and other advantages that are obtained through the use of a processor in the HDA codec.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A High Definition Audio (HDA) codec for use with an HDA amplification system that is includes a connector configured to accept an optional component, the HDA codec comprising:
a processor capable of providing a set of audio processing features;
wherein said processor is configured to determine whether the optional component is connected to the connector;
wherein said processor is configured to enable a baseline subset of the set of audio processing features, and disable one or more audio processing features outside the baseline subset, when said processor determines that the optional component is not connected to the connector;
wherein said processor is configured to enable an alternative subset of the set of audio processing features that is different from the baseline subset and that includes at least one of the audio processing features not included in the baseline subset, when said processor determines that the optional component is connected to the connector;
wherein the at least one of the audio processing features included in the alternative subset, but not included in the baseline subset, cannot be enabled unless the optional component is connected to the connector.

2. The HDA codec of claim 1, wherein said processor is configured to receive digital audio data and to process the received digital audio data to produce output signals using the enabled one of the baseline and alternative subsets of the set of audio processing features.

3. The HDA codec of claim 1, wherein:
said processor is configured to function in a first manner, when the baseline subset of the set of audio processing features is enabled; and
said processor is configured to function in a second manner that is different from the first manner, when the alternative subset of the set of audio processing features is enabled.

4. The HDA codec of claim 1, wherein the baseline subset of the set of audio processing features constrains or limits one or more of the audio processing features of the set of audio processing features.

5. The HDA codec of claim 1, wherein:
said processor is configured to disable at least a first one of the features of the set of audio processing features, when said processor determines that the optional component is not connected to the connector; and
said processor is configured to disable at least a second one of the features of the set of audio processing features, when said processor determines that the optional component is connected to the connector.

6. The HDA codec of claim 1, wherein:
said processor comprises a digital signal processor (DSP);
the optional component comprises a plug-in card; and
said DSP is configured to determine whether a plug-in card is connected to the connector.

7. The HDA codec of claim 1, wherein:
said processor is configured to access a memory including authorization information stored therein; and
said processor is configured to determine at least one of the baseline and alternative subsets of the set of audio processing features based on the authorization information.

8. The HDA codec of claim 1, wherein the HDA amplification system is capable of providing at least a first level of functionality and a second level of functionality for a particular one of the audio processing features regardless of whether the optional component is connected to the connector, wherein the second level of functionality is greater than the first level, and wherein the first level of functionality is greater than a disabled level of functionality, and wherein:
said processor is configured to limit or constrain the particular one of the audio processing features to the first level of functionality, when said processor determines that the optional component is not connected to the connector; and
said processor is configured to enable the second level of functionality for the particular one of the audio processing features, when said processor determines that the optional component is connected to the connector.

9. The HDA codec of claim 8, wherein the first and second levels of functionality comprise or otherwise affect output power levels.

10. A method implemented by a High Definition Audio (HDA) codec, wherein the HDA codec is for use with an HDA amplification system that includes a connector configured to accept an optional component, the method comprising:
(a) determining whether the optional component is connected to the connector;
(b) enabling a baseline subset of a set of audio processing features and disabling one or more audio processing features outside the baseline subset, when the optional component is not connected to the connector; and
(c) enabling an alternative subset of the set of audio processing features that is different from the baseline subset, when the optional component is connected to the connector, wherein the alternative subset includes at least one of the audio processing features that is disabled when the baseline subset is enabled;
wherein the at least one of the audio processing features that is outside the baseline subset, but is within the alternative subset, cannot be enabled unless the optional component is connected to the connector.

11. The method of claim 10, wherein the baseline subset of the set of audio processing features constrains or limits one or more of the audio processing features of the set of audio processing features.

12. The method of claim 10, further comprising:
accessing authorization information; and
determining at least one of the baseline and alternative subsets of the set of audio processing features based on the authorization information.

13. The method claim 10, wherein the HDA amplification system is capable of providing at least a first level of functionality and a second level of functionality for a particular one of the audio processing features regardless of whether the optional component is connected to the connector, wherein the second level of functionality is greater than the first level, and wherein the first level of functionality is greater than a disabled level of functionality, and wherein:
step (b) includes constraining or limiting the particular one of the audio processing features to the first level of functionality, when there is a determination at step (a) that the optional component is not connected to the connector; and
step (c) includes enabling the second level of functionality for the particular one of the audio processing features, when there is a determination at step (a) that the optional component is connected to the connector.

14. The method of claim 13, wherein the first and second levels of functionality comprise or otherwise affect output power levels.

15. The method of claim 10, further comprising receiving digital audio data and processing the received digital audio data to produce output signals using the enabled one of the baseline and alternative subsets of the set of audio processing features.

16. A High Definition Audio (HDA) codec for use with an HDA amplification system that includes a connector configured to accept an optional component, the HDA codec comprising:
a processor configured to
determine a set of authorized audio processing features that does not include every audio processing feature which the HDA amplification system is capable of providing; and
determine a set of available audio processing features based on whether the optional component is connected to the HDA amplification system;
wherein said processor is configured to configure the HDA amplification system to provide audio processing features that are included in both the set of authorized audio processing features and the set of available audio processing features.

17. The HDA codec of claim 16, wherein said processor is configured to receive digital audio data and to process the received digital audio data to produce output signals.

18. The HDA codec of claim 16, wherein said processor is configured to determine the set of authorized audio processing features by accessing a memory including authorization information stored therein.

19. The HDA codec of claim 16, wherein said processor is configured to determine the set of authorized audio processing features by retrieving one or more protection keys from memory.

20. The HDA codec of claim 16, wherein said processor is configured to determine whether the optional component is connected to the HDA amplification system.

21. A method implemented by a High Definition Audio (HDA) codec, wherein the HDA codec is for use with an HDA amplification system that includes a connector configured to accept an optional component, the method comprising:
determining a set of authorized audio processing features, wherein the set of authorized audio processing features does not include every audio processing feature which the HDA amplification system is capable of providing;
determining a set of available audio processing features based whether the optional component is connected to the HDA amplification system; and
configuring the HDA amplification system to provide audio processing features that are included in both the set of authorized audio processing features and the set of available audio processing features.

22. The method of claim 21, further comprising:
receiving digital audio data and processing the received digital audio data to produce output signals.

23. The method of claim 21, further comprising:
determining the set of authorized audio processing features by accessing a memory including authorization information stored therein.

24. The method of claim 21, further comprising:
determining the set of authorized audio processing features by retrieving one or more protection keys from memory.

25. The method of claim 21, further comprising:
determining whether the optional component is connected to the HDA amplification system.

26. A High Definition Audio (HDA) codec for use with an HDA amplification system that is configured to accept an optional plug-in, the HDA codec comprising:
a processor capable of providing a set of audio processing features;
wherein said processor is configured to determine whether the system includes the optional plug-in;
wherein said processor is configured to enable a baseline subset of the set of audio processing features, and disable one or more audio processing features outside the baseline subset, when said processor determines that the system does not include the optional plug-in;
wherein said processor is configured to enable an alternative subset of the set of audio processing features that is different from the baseline subset and that includes at least one of the audio processing features included in the baseline subset, when said processor determines that the system includes the optional plug-in; and wherein the at least one of the audio processing features included in the alternative subset, but not included in the baseline subset, cannot be enabled unless the system includes the optional plug-in.

27. The HDA codec of claim 26, wherein the optional plug-in includes firmware.

28. A method implemented by a codec, wherein the codec is for use with an amplification system that is configured to accept an optional plug-in, the method comprising:

determining whether the optional plug-in is installed or otherwise accepted;

enabling a baseline subset of a set of audio processing features, and disabling one or more audio processing features outside the baseline subset, when the optional plug-in is not installed or otherwise accepted; and enabling an alternative subset of the set of audio processing features that is different from the baseline subset and that includes at least one of the audio processing features included in the baseline subset, when the optional plug-in is installed or otherwise accepted;

wherein the at least one of the audio processing features included in the alternative subset, but not included in the baseline subset, cannot be enabled unless the optional plug-in is installed or otherwise accepted.

29. The method of claim 28, wherein the optional plug-in includes firmware.

* * * * *